Figure 1:
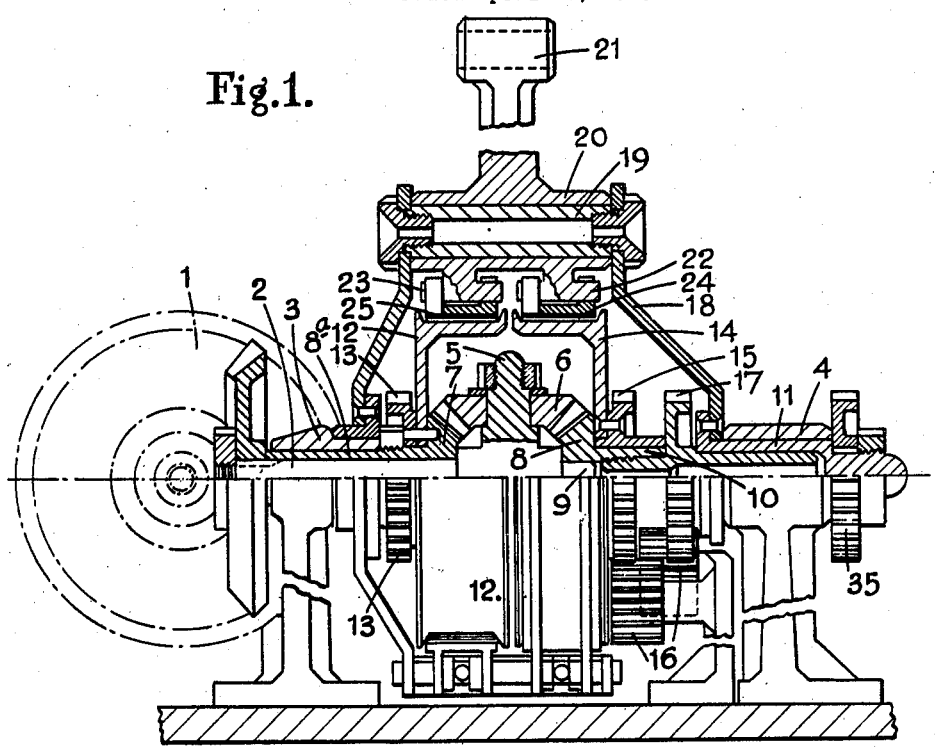

Feb. 15, 1944.    B. G. HORSTMANN    2,341,989
MECHANICAL RELAY MECHANISM
Filed April 13, 1943

INVENTOR
B. G. HORSTMANN

Patented Feb. 15, 1944

2,341,989

UNITED STATES PATENT OFFICE 2,341,989

MECHANICAL RELAY MECHANISM

Bevan Graham Horstmann, Box, England

Application April 13, 1943, Serial No. 482,895
In Great Britain July 1, 1941

2 Claims. (Cl. 74—388)

This invention relates to mechanical relays, that is to say mechanical devices by means of which the movement of an initiating or control member, which may also be referred to as a servo impulse, causes the larger effort of a suitable prime mover, such as an electric motor, to become effective through the mechanism on an output element and thus at a cost of a small control effort a large output effort is obtained on the output member, such large output effort being utilized for performing any desired task which it would be difficult or impossible for the available small control effort to accomplish.

The invention has reference to that type of mechanical relay wherein a member driven by a prime mover is permanently geared in requisite ratio through a differential or equivalent gear to an output member, the gearing being so arranged that normally it is ineffective for transmitting drive to the output member, there being provided in conjunction with the gearing a coupling mechanism such as brakes and brake drums forming part of the differential gear operable by the control member and so arranged as to render such gearing effective for transmitting drive to the output member when the control member is operated. In common with this type of relay, the coupling mechanism of the invention is so constructed that when the control member is moved in one direction it causes the gearing to operate in such a manner as to cause the output member to move in one prearranged direction, whereas movement of the control member in the opposite direction will render the gearing operative to move the output member in a direction opposite to the said prearranged direction.

According to the present invention, the gearing includes two differential or planetary gears arranged respectively on parallel shafts, one of the shafts being operable by the prime mover and the other shaft having connected thereto, and adapted to operate, the output member, the two shafts being connected together through gear elements of the respective differentials or the like, the coupling mechanism being responsive to an initiating or control member which is also geared to the output shaft to drive the same on failure of the prime mover.

An object of the invention is to ensure that the movement of the output member is proportional to the movement of the control member and also to enable the ratio to be varied as may be desired.

Another object of the invention is to ensure that the servo action will automatically cease when no further effort is exerted on the control member, in other words the output member will move only when and while the control member moves, and, in accordance with the previous paragraph, the extent of its movement will be proportional to that of the control member.

Still another object of the invention is so to construct the relay that there shall be a direct, mechanical connection between the control and output members, so that if the prime mover fails it is still possible to operate the output member by means of the control member.

In order that the invention may be understood an embodiment thereof will now be described, by way of example, with reference to the accompanying drawing, wherein—

Figure 2:
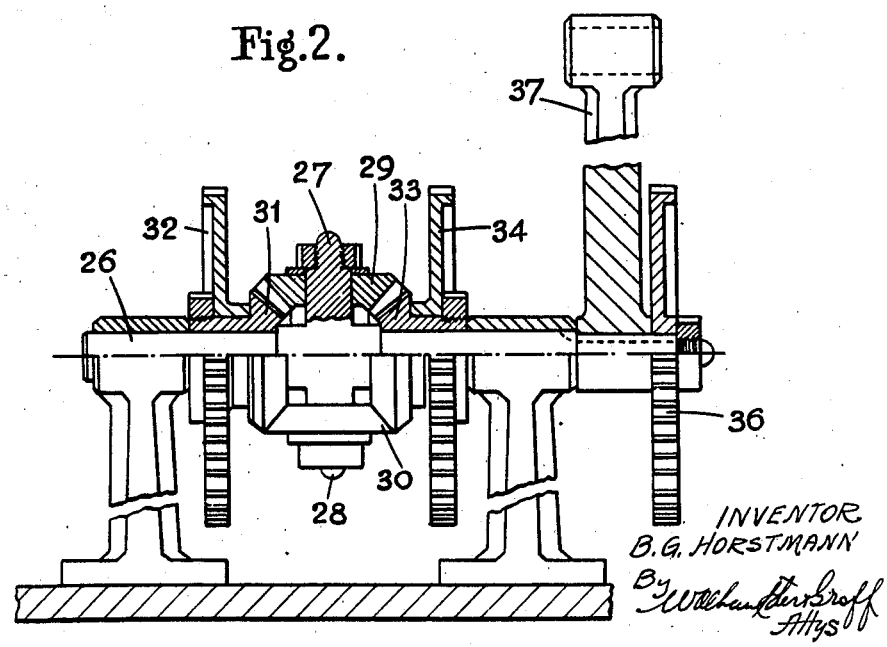

Figure 1 is a diagrammatic view, partly in section, of part of the device, while Figure 2 is a similar view of another part of the device located behind the part shown in Figure 1. The exact relationship of the two parts will become evident from the description hereunder.

Referring to the drawing in detail, in Figure 1, a prime mover, such as an electric motor 1, is arranged to drive at a requisite speed an input shaft 2 mounted in suitable bearings 3 and 4. Mounted on trunnions (one of which is indicated at 5) near the end of the shaft 2 and carried around thereby there are the planet wheels (one of which is indicated at 6) of an input differential, one sun wheel 7 of which is formed or provided with a sleeve 8a telescoped or freely mounted on the shaft 2 between the trunnions and the free end of the shaft. For clearness, this sun wheel 7 will hereinafter be referred to as the "first" sun wheel. The other, or "second," sun wheel 8 is freely mounted for rotation on the stump 9 of the shaft 2 extending beyond the trunnions and is also formed or provided with a sleeve 10 which via the boss of a gear 17 is telescoped or freely mounted within a hollow cylindrical element 11, to be referred to later, which in turn is mounted in the bearing 4. The shaft 2 with its planet wheels, the sun wheels with their sleeves, and the cylindrical element 11, thus form a composite and normally rigid rotor (the parts of which can rotate with reference to one another) mounted in the aforesaid bearings.

Secured to and rotating with the first sun wheel 7, there is a first brake drum 12 carrying a first gear wheel 13, and rotatably mounted on the second sun wheel 8 there is a second brake drum 14 which has secured to it a second gear wheel 15 meshing through reversing gears 16 mounted in the framework of the device with a gear 17 secured to the sleeve 10 of the second sun wheel 8.

In the arrangement so far described, when the prime mover is operative, the shaft 2 and the planet gears mounted thereon will rotate and as long as no load is applied to either sun wheel 7 or 8 the planet gears will rotate both sun wheels in the same direction and at the same speed. The first brake drum 12, being secured to the first sun wheel 7, will rotate therewith in one direction, but the second brake drum mounted in the second sun wheel 8 will rotate in the opposite direction owing to the action of the reversing gears 16 described.

Mounted for rocking co-axially with the composite rotor described above, there is a cage 18 surrounding the differential 6, 7, 8, brake drums 12, 14, and gears 13, 15, 16, 17 referred to. Secured in the cage parallel to the composite rotor there is an auxiliary shaft 19 on which is pivoted by means of a hub 20 a control member 21, such as an arm which may be operable by hand. The hub is formed with two knuckle elements 22 and 23, respectively engaging brake bands 24 and 25 each mounted on one of the brake drums 12, 14. The said knuckles 22 and 23 are so arranged that when the control member 21 is rocked in one direction, one of the brake bands is applied to its drum, while the other releases its drum; conversely, on moving the control member in the other direction the brake bands are applied and released in the reverse way.

Referring to Figure 2, mounted in bearings parallel to the composite rotor there is an output shaft 26 formed substantially centrally with two trunnions 27 and 28 carrying the planet wheels 29 and 30 of an output differential, a first sun wheel 31 of which is rotatably mounted on the output shaft 26 and has secured thereto a gear 32 meshing with the gear 13 secured to the first brake drum 12, a second sun wheel 33 of the output differential being similarly mounted and carrying a gear 34 meshing with the gear 15 secured to the second brake drum.

Finally, the cylindrical element 11 above referred to and secured to the cage 18 has mounted thereon a gear 35 (Figure 1) meshing with a gear 36 secured to the output shaft 26. It should be noted in the illustrated embodiment that all the gears mounted on the composite rotor on input shaft 2 are of the same size and all the gears mounted on the output shaft 26 are of the same size. However, particularly to secure movement of the output 37 in the same direction as the control member 21, the gears 35 and 36 may be varied by the interposition of an intermediate gear therebetween. Further, the ratio between the gears 35 and 36 determines the proportionately between the movements of the control member 21 and output member 37 secured to the output shaft 26 and is alterable by changing said gears.

In operation, when the composite rotor on input shaft 2 is rotated by the prime mover 1 and both sun wheels 7 and 8 of the rotor are subject to the same load, the planet wheels (e. g., 6) carried on trunnions fixedly mounted on input shaft 2 of the input differential will rotate both sun wheels 7 and 8 at the same speed and in the same direction, whereby the first brake drum 12 attached to sun wheel 7 is rotated in the same direction as the differential rotates, while the second brake drum 14 rotatably mounted on sun wheel 8 and driven thereby through the reversing gears 16, rotates at the same speed, but in the opposite direction owing to the provision of the reversing gearing 16 mentioned above. The gear 13 attached to the first brake drum 12 drives the gear 32 attached to the first sun wheel 31 of the output differential on output shaft 26 in one direction, and the gear 15 attached to the second brake drum 14 drives through gear 34 the second sun wheel 33 of the output differential at the same speed but in the opposite direction, and thus the planet wheels 29 and 30 carried in the trunnions on output shaft 26 of the output differential will rotate around their common axis, but will not perform planetary movement and consequently the output shaft 26 and the output member 37 will remain at rest.

If now the control member 21 is rocked about its shaft 19 in the cage 18 with reference to the latter in one direction, one of the knuckles 22 or 23 will tighten one of the brake bands 24 or 25, say the brake band 25 appertaining to the first brake drum 12. The rotation of this brake drum and therewith of the gear 13 connected thereto and of the first sun wheel 7 of the input differential is thereby arrested, but as the planet wheels as 6 of the input differential continue their planetary movement, they will cause the second sun wheel 8 to continue its rotation in the original direction, the second brake drum 14 continuing its rotation in the opposite direction. Owing to the arrest of the gear 13 connected to the first brake drum 12, the gear 32 connected to the first sun wheel 31 of the output differential and the first sun wheel 31 itself are also arrested, while the second sun wheel 33 continues its rotation and thus causes the planet wheels 29 and 30 meshing with it to perform planetary movement and thereby rotate the output shaft 26 and therewith the output member 37 which will rock in the same direction as the control member. While very little effort is required for rocking the control member 21 for the application of one of the brake bands, this small effort renders the gearing between the prime mover 1 and the output shaft 26 effective in the manner described, and thus the effort of the prime mover 1 will become operative upon the output member 37, the movement of the latter being in the desired predetermined proportion to the movement of the control member 21.

It will be observed that when the control member 21 is operated, it first of all performs pivotal movement with reference to the cage 18 for tightening one of the brake bands, but as soon as the brake band has been tightened, further movement of the control member is about the axis of the composite rotor via the cage. When the cage 18 rotates, the gear attached to the cylindrical element 11 secured to the cage also rotates and through the intermediate gear (not shown) causes rotation of the gear 36 secured to the output shaft, but this gear is also rotated by the output shaft 26 when the effort of the prime mover 1 becomes effective thereon. The effect produced on the gear 36 secured to the output shaft 26 from each of the two sources mentioned is the same and therefore this gear, the intermediate gear when used, and the gear 35 secured to the cylindrical element 11, roll down on one another ineffectively during the operation so far described.

The purpose of the gears 35, 36 just referred to is twofold. Firstly, should the prime mover fail for any reason it is possible to operate the output member mechanically through the control member with the aid of these gears 35, 36, which provide a direct connection. Secondly, these gears provide an automatic stop for the output shaft 26 and also for the control member 21 when the latter is released, in the following manner. When the control member is released the output shaft should stop, but owing to inertia it will tend to continue its rotation, the gear 36 secured thereto following this tendency, which is also transmitted to the gear 35 connected to the cylindrical element 11 and through it to the cage 18. Therefore the cage also continues its tendency to rock about its axis and thus it will perform relative movement with reference to the control member 21 as a result of the inertia operating on the latter. This relative movement is opposite to that to which reference has been made above, and thus by actuation of the control member by the cage, the other brake band, namely, 24, appertaining to the second brake drum 14, is momentarily tightened, and accordingly there arises the tendency to rotate the output shaft 26 and the cage 18 in the opposite direction (through the connections already described), whereby relative rocking movement again takes place between the cage 18 and the control member 21 owing to the inertia of the latter, the brake band 24 appertaining to the second brake drum 14 being released and the brake band 25 being released and the brake band 25 appertaining to the first brake drum 12 being tightened so that the whole process is reversed and so forth, the cage 18 thus performing a hunting or oscillating movement and the oscillations steadily diminishing until the cage and also the output shaft 26 definitely stop. This hunting or oscillation is so slight and ends so rapidly that in practice it almost amounts to instantaneous stopping of the output member 26 when the control member 21 is released, but it has been described at length so that it may be appreciated how the self-stopping action takes place.

It will be obvious to those skilled in the art how the device operates for moving the output member in a direction opposite to that described when the control member is originally moved in a direction opposite to that assumed for describing the operation.

The relay mechanism described may be usefully employed in various devices and machinery used in engineering, but it may be mentioned that one particularly useful application is in connection with aircraft where the output member may form or be connected to the control surfaces. The mechanism may similarly be utilised in marine craft for operating the rudder.

I claim:

1. In a mechanical relay system, an input shaft, an output shaft, an input planetary gearing system comprising a first input sun wheel and a second input sun wheel and input planet wheels, means fixedly carried by said input shaft whereon said input planet wheels are mounted for engagement with said input sun wheels respectively, a first cross gear and a first primary brake member fixedly directly driven by said first input sun wheel, a second cross gear and a second primary brake member, reversing means driven by said second input sun wheel for driving said second cross gear and said second primary brake member in reverse direction to said second input sun wheel, a control member, means for displaceably mounting said control member, a first and a second secondary brake members respectively associated with and cooperating with said primary brake members, said control member comprising engaging means engageable selectively with said first secondary brake member or said second secondary brake member for selectively causing a said secondary brake member to engage its corresponding primary brake member, an output planetary gearing system comprising a first output sun wheel and a second output sun wheel and output planet wheels, means fixedly carried by said output shaft whereon said output planet wheels are mounted for engagement with said output sun wheels respectively, said first output sun wheel having gear means mounted to engage with said first cross gear, said second output sun wheel having gear means mounted to engage with said second cross gear, whereby when said control member is in normal position rotation of said input shaft does not drive said output shaft, and displacement of said control member in one direction causes rotation of said input shaft in a given direction to rotate said output shaft in one direction, and displacement of said control member in the other direction causes rotation of said input shaft in said given direction to rotate said output shaft in the other direction.

2. A system according to claim 1, said means for displaceably mounting said control member comprising cage means rockably mounted on said input shaft and wherein said control member is received, sleeve means freely mounted coaxially on said input shaft and fixed to said cage means for rotation thereby, first traverse gear means fixedly carried by said sleeve means, and second traverse gear means comprising means fixedly carried by said output shaft for transmitting motion through engagement with said first traverse gear means between said output shaft and said sleeve means, whereby when said control member has been released to normal position, further rotation of said output shaft applies through said traverse gear means to said cage means a displacement causing said control member to cause application of stopping torque to said output shaft opposing its direction of rotation.

BEVAN GRAHAM HORSTMANN.